United States Patent [19]

Schmidt

[11] Patent Number: 5,358,050
[45] Date of Patent: Oct. 25, 1994

[54] METHOD FOR KILLING A GAS BLOWOUT OF A WELL

[75] Inventor: Joseph H. Schmidt, Anchorage, Ak.

[73] Assignee: Atlantic Richfield Company, Los Angeles, Calif.

[21] Appl. No.: 32,911

[22] Filed: Mar. 18, 1993

[51] Int. Cl.$^5$ .............................................. E21B 33/13
[52] U.S. Cl. .................................. 166/294; 166/295; 166/300
[58] Field of Search ............... 166/271, 281, 292, 294, 166/295, 300; 175/72; 252/8.551

[56] References Cited

U.S. PATENT DOCUMENTS

| | | | |
|---|---|---|---|
| 3,003,557 | 10/1961 | Huitt et al. | 166/281 X |
| 4,025,443 | 5/1977 | Jackson | 252/8.551 X |
| 4,143,715 | 3/1979 | Pavlich | 166/281 X |
| 4,151,096 | 4/1979 | Jackson | 252/8.551 X |
| 4,172,801 | 10/1979 | Jackson | 252/8.551 X |
| 4,708,206 | 11/1987 | Jennings, Jr. | 166/281 |
| 4,817,719 | 4/1989 | Jennings, Jr. | 166/292 |
| 4,819,727 | 4/1989 | Jennings, Jr. | 166/292 |
| 4,899,819 | 2/1990 | Hazlett et al. | 166/285 |

*Primary Examiner*—George A. Suchfield
*Attorney, Agent, or Firm*—Michael E. Martin

[57] ABSTRACT

Gas blowouts in wells are controlled by injecting a cohesive aqueous gel composition of hydroxypropyl guar gum, a borate salt cross-linking agent and a weighting agent such as silica flour, barite, hematite or iron oxide. The kill fluid is less susceptible to atomization than weighted drilling fluids, is readily available in most oil and gas field operations and may be rapidly prepared in quantities suitable for injecting into a well to control a gas blowout.

5 Claims, No Drawings

METHOD FOR KILLING A GAS BLOWOUT OF A WELL

BACKGROUND OF THE INVENTION

1. Field of the Invention

The present invention pertains to a method of killing or arresting a gas blowout of a well using a dense gel which includes hydroxypropyl guar and a weighting agent.

2. Background

Gas blowouts sometimes occur during the drilling of a well or due to the malfunction of a well device or structure. Relatively dense liquids are usually employed during the drilling of a well and often when attempting to arrest or kill a well blowout. Drilling fluids comprising a water or oil base together with a weighting agent and a dispersant or fluid loss control material are commonly used as "kill" fluids in attempts to control a gas blowout of a well. The use of this type of material is often not very successful, depending on the pressures and velocities of the gas stream, since the counterflow of the gas stream with respect to the flow of the kill fluid into the well creates substantial turbulence and atomization of the kill fluid. The result is that the kill fluid flow cannot overcome the gas flow, is entrained with the gas flow and ejected from the well in a turbulent spray or atomized state. However, with the method of the present invention, a gas well blowout is more easily brought under control using a material which is generally readily available for oil field operations and uses, as a fundamental component, hydroxypropyl guar.

U.S. Pat. Nos. 4,708,206, issued Nov. 24, 1987, 4,817,719, issued Apr. 4, 1989, 4,819,727, issued Apr. 11, 1989, all to Jennings, Jr., and 4,899,819, issued Feb. 13, 1990 to Hazlett, et al all describe processes for shutting in a well using a solidifiable, pumpable gel mixture which includes hydroxypropyl guar gum. However, these patents do not suggest using a dense cohesive gel-like material in a method for stemming the flow of gas in a gas blowout of a well, which is an essential aspect of the present invention.

SUMMARY OF THE INVENTION

The present invention provides an improved method for controlling or shutting off the flow of gas from a gas blowout of a well using a gel-like material including guar, hydroxypropyl guar or a similar gum which is capable of forming a significantly cohesive and dense material.

The method of the present invention, together with the "kill" fluid composition utilized therein, is capable of controlling or shutting off the flow of gas from a subterranean formation through a well structure by pumping a quantity of the kill fluid into the well in contraflow to the flowstream of gas emanating from the well. By utilizing a strongly cohesive fluid which includes guar, particularly hydroxypropyl guar, water and a cross-linking agent such as borax, together with a weighting agent such as barite or silica, there is significantly less tendency for the fluid to be atomized and entrained in the gas flowstream and the density and cohesiveness of the fluid is superior in closing off gas flow channels which would have a tendency to form in the fluid.

The present invention still further provides an improved gas blowout control or kill fluid comprising a weighted gel material preferably made of hydroxypropyl guar gum, a cross linking agent and a weighting material.

The above-noted aspects of the present invention, together with other superior features thereof will be further appreciated by those skilled in the art upon reading the description which follows.

DESCRIPTION OF A PREFERRED EMBODIMENT

Gas blowouts in wells are usually difficult to control. For example, in drilling a gas or oil well, a weighted drilling fluid is used to stabilize the wellbore and minimize the violent blowout type flow of liquid or gaseous fluids when the drill bit encounters a reservoir or zone of an earth formation containing such fluids at high pressures. However, in spite of modern day well practices and structures, unforeseen high-pressure gas may be encountered during drilling or other phases of well activity. Conventional fluids such as oil or water-based drilling fluids are not particularly effective at controlling the flow of gas out of the well during a blowout condition. These fluids are not cohesive enough to prevent entrainment and development of what behaves like a single phase gas/drilling fluid mixture which flows from the well at high velocity, even when tremendous volumes of this fluid are pumped into the well in an effort to overcome the gas flowing therefrom. Even when large quantities of drilling "mud" based kill fluids are introduced into and through single or multiple relief wells which have been drilled to intersect or penetrate the vicinity of the blown out well, the gas pressures are often significant enough to prevent effectively killing of the well.

Gel-forming materials are usually present in oil field operations or at supply points therefor. One gel-forming material which is widely used in fracturing fluids is hydroxypropyl guar gum which, when mixed with water and in the presence of a cross-linking agent such as a borate salt, including borax, will form a rather cohesive gel-like material which is capable of being pumped. In accordance with the present invention, the use of this type of fluid, including a weighting agent, pumped into a well which has blown out in contraflow direction with respect to the flow of gas will not tend to atomize or be entrained with the gas flow but will collect in the well. As the amount of gel material pumped into the well increases, eventually the flow of gas will be channelized through this material and with continued pumping of the material into the well, the gas channels will be reduced in size and eventually closed off.

A preferred gelling material is hydroxypropyl guar gum commonly used as a cross-linked fracturing fluid. This gum, when mixed with water and with a cross-linking agent such as a borate salt and a weighting agent, will form a very cohesive gel-like material which is pumpable, relatively dense, and may be used to kill or control a gas blowout in a well. The weighting material may be selected from a group consisting of silica flour, barite, hematite or iron oxide, depending on the density of the fluid required.

A preferred method in accordance with the present invention is as follows. Upon initiation of a gas blowout of a well, a quantity of the above-mentioned composition comprising hydroxypropyl guar gum, a chromate or borate salt such as borax and a weighting agent such as barite is mixed in the following proportions per thousand gallons of water:

60 pounds of HPG (hydroxypropyl guar gum)
2 gallons of borax
10,000 pounds of barite particulate
0.1 gallons of biocide (formaldehyde)

The biocide is added in certain formations to minimize contamination and plugging of the formation, depending on the type of water used. Processed sea water or produced water from the North Slope of Alaska, for example, requires the above-mentioned biocide. The above-mentioned composition has a density of about 17.2 pounds per gallon.

A sufficient quantity of this composition should be mixed to sustain injection rates up to 300 to 400 barrels (42 U.S. gallons/barrel) per minute (bpm) into the well to choke off the gas flow. Flow rates of about 200 bpm are more likely to be all that would be needed. A mixture such as mentioned above will form a substantially cohesive thixotropic mass which is pumpable. This mixture is injected into the well through one or more relief wells drilled to intersect the blown out well or drilled into the formation region near the blowout point of origin. When the relief well or wells reach their total depth, the above-described kill fluid composition is injected into the formation through the relief wells to fracture the formation which usually will break into the blown out well. The viscous and cohesive kill fluid will cause, initially, channels to be formed therein as the gas flows through the fluid. These channels will eventually be squeezed shut as more fluid is pumped into the relief well or wells to eventually "kill" the blowout. In rare instances the mixture may be injected directly into the blown out well through the drillstring or any tubing string still in the well, or directly into the well at the surface in contra flow direction with respect to the flow of gas out of the well. Injection is continued until the blown out well is brought under control after which conventional well recovery procedures may be carried out. With the well under control, the kill fluid may be solubilized with hydrochloric acid, for example, in a concentration of about 3 to 28 percent by volume.

Other chemicals satisfactory for use as gel breakers including those discussed in the prior art may be used to solubilize the amount of the kill fluid composition in the wellbore once it is under control wherein the composition may then be circulated out of the well using conventional well drilling or control fluids.

As will be appreciated by those skilled in the art, the composition of the well control or kill fluid described above may be modified for certain formation conditions. A particular advantage of the well control fluid composition described is that the components of this composition are readily available in most oil and gas field operations which is an important consideration in the event of a loss of well control or blowout. Moreover, although a preferred embodiment of the present invention has been described in some detail herein, those skilled in the art will also recognize that certain modifications and variations may be implemented without departing from the scope and spirit of the invention recited in the appended claims.

What is claimed is:

1. A method for controlling a gas blowout of a well penetrating an earth formation, comprising the steps of:
   pumping a gel composition into said well until the gas emanating therefrom is brought under control and wherein said composition is characterized by a mixture of water, guar, a cross-linking agent and a weighting agent.

2. The method set forth in claim 1 wherein:
   the cross-linking agent is selected from a group consisting of a borate salt and achromate salt.

3. The method set forth in claim 2 wherein:
   the cross-linking agent is borax.

4. The method set forth in claim 1 wherein:
   the weighting agent is selected from a group consisting of silica flour, barite, hematite and iron oxide.

5. The method set forth in claim 1 wherein:
   the guar is provided as hydroxypropyl guar gum.

* * * * *